Figure 1:
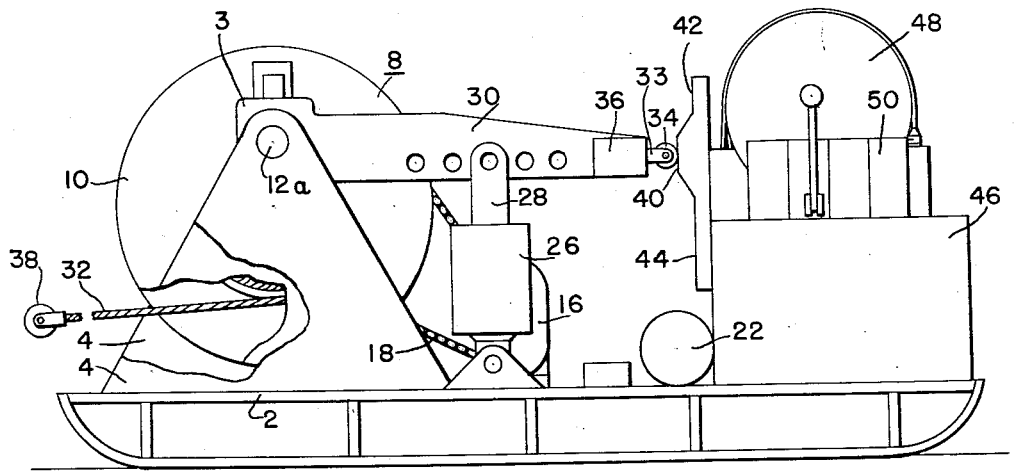

Jan. 2, 1962 C. B. FRELLSEN 3,015,473
TENSION CONTROL DEVICE
Filed Aug. 6, 1958 2 Sheets-Sheet 1

*INVENTOR.*
CARLTON B. FRELLSEN
BY
ATTORNEY

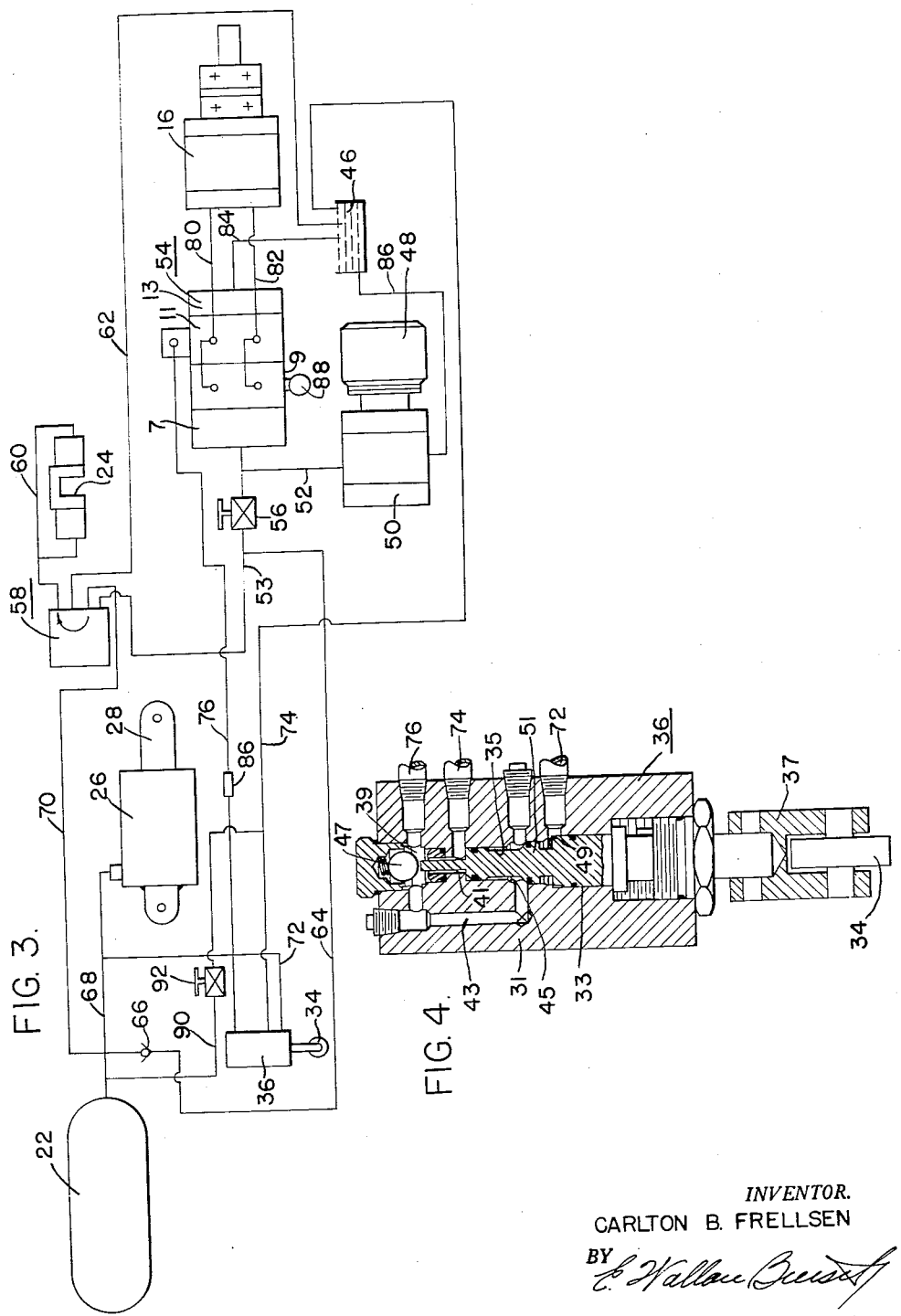

3,015,473
Patented Jan. 2, 1962

3,015,473
TENSION CONTROL DEVICE
Carlton B. Frellsen, Franklin, Pa., assignor to Joy Manufacturing Company, Pittsburgh, Pa., a corporation of Pennsylvania
Filed Aug. 6, 1958, Ser. No. 753,568
17 Claims. (Cl. 254—172)

This invention relates to a control device and more particularly to a control device for maintaining proper tension in a traveling endless belt conveyor which can be extended or retracted.

At the present time it is common practice to provide a moving endless belt conveyor with a belt storage loop whereby the effective conveying length of the system may be varied by being lengthened or shortened. Heretofore such storage loops have been obtained by reversing the conveyor belt over spaced clusters of rollers, one of which clusters is movable towards and away from the other. Such a cluster system of storing belt requires a frame for supporting the pulley clusters at all times so that the amount of belt that may be stored therein has been limited due to the size of the frame which may be employed to obtain proper continuous support of each of the reversed portions of the conveyor belt runs. It has been proposed that a loop belt portion be provided which extends angularly from the effective conveying run of the conveyor belt with the outer end of the conveyor belt being supported by a retractable belt reversing roller whereby a longer length of conveyor belt may be stored than with the previously known systems. In order, however, to maintain proper tension in the conveying run of the belting, it is necessary under the proposed system to maintain proper tension in such an angularly extending belt storage loop.

Accordingly one object of this invention is to provide a new and improved device for maintaining tension in long storage lengths of traveling endless conveyor belting.

Another object of this invention is to provide a new and improved device for maintaining tension in an endless conveyor belt comprising a retractable and extensible force transmitting means in which the force transmitted varies in response to the length of conveyor belt desired and which effects operation of additional means whereby the retractable and extensible means transmits a substantially uniform force.

Still another object of this invention is to provide a new and improved device for maintaining tension in an endless conveyor belt comprising a connection to the conveyor belt which actuates a single pressure circuit for controlling the connection.

A more specific object of this invention is to provide a new and improved device for maintaining tension in an endless conveyor belt comprising a cable reel which is normally non-rotatable about its central axis and the cable of which is connected to a conveyor belt support and which cable reel is normally rotatable about an offset axis which rotation, when sufficient effects the operation of means to permit said cable reel to rotate about its central axis.

Still another more specific object of this invention is to provide a new and improved device for maintaining tension in an endless conveyor belt comprising a cable reel having an arm extending therefrom which reciprocates in an arcuate path to energize means for driving or releasing the cable reel for rotation about its central axis.

A further object of this invention is to provide a new and improved device for maintaining tension in an endless conveyor belt comprising a rotatable cable reel the rotation of which is controlled by a pilot valve which is constantly biased into engagement with a cam surface.

Figure 2:
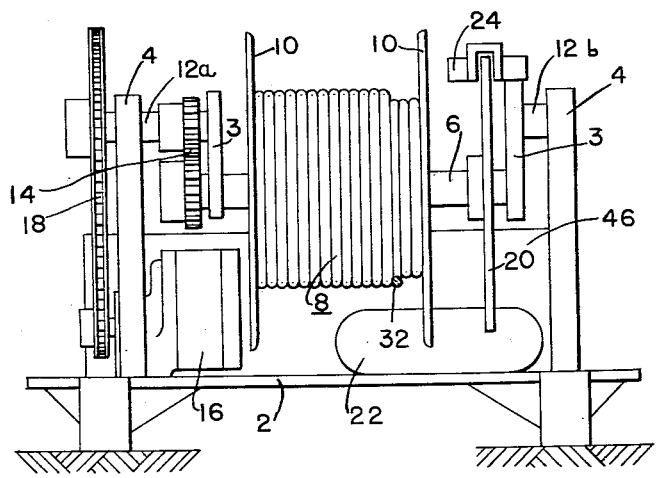

These and other objects of this invention will become more apparent upon consideration of the following detailed description of a preferred embodiment thereof, when taken in conjunction with the following drawings, in which:

FIG. 1 is a side elevational view of a control device constructed in accordance with the principles of this invention with a portion thereof broken away to more clearly show the structure thereof, FIG. 2 is an end elevational view of the control device as shown in FIG. 1, FIG. 3 is a schematic diagram of the control circuit employed in the control device as shown in FIG. 1, and FIG. 4 is a cross sectional view of a pilot valve employed in the control circuit shown in FIG. 3.

Referring to FIGS. 1 and 2 it will be noted that a control device constructed in accordance with the principles of this invention comprises a suitable elongated base 2 having a pair of laterally spaced rigid arms 4 extending upwardly therefrom adjacent one end thereof. Laterally extending shafts 12a and 12b are suitably supported adjacent the upper ends of the arms 4, respectively, so that the shafts 12a and 12b are rotatable about the same longitudinal axis. Suitable elongated side members 3 are suitably rotatably supported adjacent the opposed ends of the shafts 12a and 12b, respectively, to extend downwardly adjacent the opposed sides of the arms 4. The lower portions of the side members 3 rotatably support the opposite ends of an elongated rotatable shaft 6 therebetween which shaft 6 has a suitable cable reel 8 centrally rigidly mounted thereon. As shown, the sides 10 of the reel 8 are spaced longitudinally from each other and inwardly from the side members 3. The vertically opposed portions of the shaft 12a and the shaft 6 inwardly adjacent the arm 4 are provided with a suitable gear train 14 so that the rotation of the shaft 12a causes the shaft 6 to be rotated. The end of the shaft 12a disposed outwardly from its supporting arm 4 is connected to the output shaft of a suitable hydraulic motor 16 mounted on the base 2 in any suitable manner such as by a chain drive 18 as is well known in the art.

In order to lock the shaft 6 to the shafts 12a and 12b the portion of the shaft 6 between the arm 4 supporting the shaft 12b and the cable reel 8 has a radially outwardly extending disk 20 rigidly secured thereto the outer edge of which passes between movable blocks of a disk brake 24 whereby the disk 20 is clamped therebetween. The disk brake 24 may be of any suitable structure having a pair of hydraulically actuated movable blocks which move into and out of engagement with the outer side surfaces of the disk 20 is is well known in the art.

As shown in FIG. 1, the side member 3 adjacent the gear train 14 is provided with an integral elongated arm portion 30 which normally extends horizontally therefrom above the base 2. A suitable hydraulic cylinder 26 as is well known in the art is suitably secured to the base 2 having a hydraulically actuated rod 28 extending therefrom the outer end of which is pivotally secured to an intermediate portion of the elongated arm 30. The outer end of the arm portion 30 is provided with a roller 34 mounted on a horizontally reciprocable plunger 33 of a pilot valve 36 (FIG. 4) as more fully described hereinafter. The roller 34 of the valve 36 is constantly biased outwardly from the arm 30 into engagement with a cam having a vertically extending cam surface. Such cam surface is formed to provide an elongated vertically extending middle flat 40 having an elongated upper flat 42 and an elongated lower flat 44 at opposite ends thereof which are joined by suitable cam transition portions. As shown, the upper and lower flats 44 and 42 are spaced further outwardly from the free end of the arm portion 30 so that upon movement of the arm portion 30 in an arcuate direction about the shafts 12a and 12b the roller 34 moves outwardly from the free end of the arm portion 30.

Although the cam may be supported in any suitable manner in rigid relationship to the base 2, as shown, it is rigidly secured to a suitable hydraulic fluid storage tank 46 rigidly mounted on the base 2. For the purpose of reducing the overall size of the control device an electric motor 48 and a hydraulic pump 50 are also preferably rigidly secured to the upper portion of the tank 46 and an accumulator 22 is rigidly secured to the base 2 adjacent the tank 46 and below the arm portion 30. The electric motor 48 is employed to drive the pump 50 to obtain the necessary flow of pressurized hydraulic fluid in the control circuit of this invention. As shown, a cable 32 is wound around the cable reel 8 so that its free end extends therefrom in a direction opposite that in which the arm portion 30 extends. In order to accomplish the purposes of this invention the free end of the cable 32 is suitably secured to a rotating conveyor belt reversing roller 38 about which an endless conveyor belt travels with the belt runs extending therefrom in the same direction as the cable 32 extends from the reel 8. As is well known in such conveyor systems the force is transmitted by the conveyor belt to the roller 38 and consequently the unwound portion of the cable 32 varies in length as the demand for conveyor belt varies.

In the operation of the control device the motor 48 is energized at all times to drive the pump 50 which has a suitable high pressure fluid transmitting discharge line 52 (see FIG. 3) connected to a control valve 54. The line 52, as the lines hereinafter identified, may be of any suitable structure for transmitting fluid as is well known in the art and may be secured at its opposite ends to various devices or connecting devices as are well known in the art.

For the purpose of this invention the control valve 54 may be of any one of various suitable valve structures as are well known in the art. For the purpose, however, of describing this invention the control valve 54 comprises a pilot operated valve having a manual section 9, a pilot section 11 and an exit section 13 in conjunction with a relief section 7. As shown the line 52 is initially connected to the relief section 7 which is sequentially secured to the sections 9, 11 and 13 as is well known to form the valve 54. For a more complete showing and description of a sectional type of valve having similar portions reference is made herein to Patent No. 2,964,022, by the same inventor as the inventor of this invention and which patent has been assigned to the same assignee as the assignee of this invention. The discharge line 52 is also connected by means of a line 53 having a suitable hand operated valve 56 therein to a suitable brake valve 58 as is well known in the art.

The high pressure discharge side of the pump 50 is also connected to the accumulator 22 by means of a suitable line 64 having a suitable check valve 66 therein which extends from the line 53 between the valves 56 and 58 to a line 68 directly connected to the accumulator 22. The check valve 66 is provided so that no back flow of fluid from the accumulator 22 to the line 52 can occur when the pressure in the accumulator 22 is higher than that in the line 52 which occurs when the line 52 is connected to the tank 46. Also, the line 64 permits the pump 50 to charge the accumulator 22 at all times. The line 68 is connected to the expansion chamber of the hydraulic cylinder 26 to bias the rod 28 thereof outwardly therefrom. With the normally desired tension in the cable 32, the cable 32 tends to cause clockwise rotation (with reference to FIG. 1) of the cable reel 8 about the center of the shafts 12a and 12b and, accordingly, the hydraulic cylinder 26 and the pressure in the system is selected so that the outward force of the hydraulic cylinder 26 on the rod 28 biases the arm 30 in a counterclockwise direction (FIG. 1) sufficiently to balance the normally desired force in the cable 32 whereby the reel 8 remains in its normal central position.

The accumulator 22 is also connected to the brake valve 58 by a line 70 and the brake valve 58 is connected to the brake 24 by means of a line 60 and to the tank 46 by a line 62. As is known in the art, the brake valve 58 is of a structure whereby the high pressure fluid in the accumulator 22 is normally transmitted through the lines 68 and 70 to cause a movable spool of the brake valve 58 to be biased in a direction whereby the line 70 is connected to the line 60 whereby the movable portions of the brake 24 are locked against the sides of the disk 20.

The brake valve 58 is also constructed so that the pressure of the fluid flow from the pump 50 through lines 52 and 53 is exerted on a greater area of the spool of the valve 58 and in a direction opposite the bias resulting from the accumulator pressure so that when the discharge pressure of the pump 50 exerts a force on the spool of the valve 58 greater than the force exerted by the accumulator 22 on the spool of the valve 58, the spool of valve 58 is moved to disconnect the line 70 from the line 60 to the relief line 62 whereby the fluid pressure in line 60 collapses and the movable portions of the brake 24 are instantaneously released from the sides of the disk 20 so that the cable reel 8 is free to be driven by the shaft 6. Accordingly for such automatic control operation the valve 56 is normally open.

The pilot valve 36 is connected to the accumulator 22 by a suitable line 72 connected to the line 68, and to the tank 46 by means of a line 74 extending therebetween, and connected to the pilot section 11 of the control valve 54 by a suitable line 76. As shown in FIG. 4 the valve 36 comprises an elongated body 31 having a formed elongated bore 35 extending therethrough in which the plunger 33 is closely received for reciprocable movement. The outer end of the plunger is rigidly secured in any suitable manner to a suitable holder 37 for the roller 34. As can be appreciated suitable means are provided to seal the ends of the bore 35, to prevent the plunger 33 from rotating in the bore 35, and to properly limit the travel of the plunger 33 in opposite directions as are well known in the art. The line 76 is connected to a chamber 39 formed by the bore 35 at the inner end thereof and the chamber 39 is connected by an axially outwardly extending portion 41 of the bore 35 to the line 74. The chamber 39 is also connected by means of an elongated generally axially extending passageway 43 to another chamber 45 formed by the bore 35 and which is spaced axially outward from the extending portion 41. As shown, a ball 47 is biased by means of a suitable spring in a direction to close the upper end of the portion 41 so as to close the line 76 from the line 74.

Under balanced tension-pressure operating conditions the plunger 33 is biased inwardly of the housing 31 by the engagement of the roller 34 with the cam surface 40 whereby the inner end of the plunger 33 engages and unseats the ball 47 so that the connecting portion 41 of the bore 35 is normally open. The line 72 is connected to the outer edge of the chamber 45 and the plunger 33 is provided with an annular area 49 which is located in the outer portion of the chamber 45 so that fluid flow from the accumulator 22 is always effective thereon to bias the plunger 33 outwardly of the housing 31. Under balanced operating conditions the inner and outer portions of the chamber 45 are sealed from each other by an intermediate portion 51 of the plunger 33; however, upon outward movement of the plunger 33 the intermediate portion 51 of the plunger 33 travels outwardly of the chamber 45 whereby the line 72 is connected to the line 76, by the passageway 43 connecting the chambers 39 and 45. Outward movement of the plunger 33 also causes the inner end of the plunger to move outwardly out of engagement with the ball 47 so that the line 74 is closed from the line 76.

The pilot valve 36 is employed to permit controlled high pressure fluid flow to the section 11 of the valve 54 so that the spool thereof moves to a position to connect the line 52 through the sections 7, 9, 11 and 13 to a supply line 80 connected to the hydraulic motor 16. The motor 16 is also provided with an exit line 82 which is also controlled by the sections of the valve 54 so that when the line 52 is connected to the line 80 line 82 is connected to a line 84 extending therefrom to the tank 46. Under normal balanced conditions the line 76 is connected to the line 74 which, since line 74 is connected to the tank 46, prevents any pressure from being built up in the line 76 to obtain operation of the spool of the section 11 of the valve 54. Upon outward movement of the plunger 33 and the roller 34 the line 72 is connected to the line 76 so that fluid flows from the accumulator 22 through lines 68, 72 and 76 to the section 11 of the valve 54 to cause operation of the spool thereof. It will also be noted that a supply line 86 is provided for the pump 50 which extends therefrom to the tank 46.

Under normal operating conditions a high pressure fluid is contained in the accumulator 22 and the high pressure fluid discharged from the pump 50 flows from line 52 through the relief section 7 of the valve 54 through line 84 to the tank 46. Accordingly, a low tank pressure will exist in lines 53 and 64 so that no pressure fluid will be available to obtain movement of the spool of the brake valve 58 or of the check valve 66. At the same time the accumulator fluid pressure through lines 68 and 70 holds the spool of the brake valve 58 in its normal position so that the fluid medium from the accumulator flows through the valve 58 to the line 60 to hold the movable portions of the brake 24 into rigid engagement with the sides of the disk 20 to prevent rotation of the spool 8 about the shaft 6.

Assuming a condition wherein slack occurs in the cable 32 the reel 8 is rotated counterclockwise (FIG. 1) since the clockwise turning effect of the reel 8 resulting from the tension in the cable 32 is eliminated and the upward thrust of the hydraulic cylinder 26 is constantly applied so that the arm 30 rotates upwardly about the shaft 12a. Such upward movement of the arm 30 causes the roller 34 to move upwardly off the center cam surface 40 and due to the bias on the plunger 33 the roller 34 moves into engagement with the upper cam surface 42. Such outward movement of the roller 34 and plunger 33 connects the accumulator 22 through lines 68 and 72, the pilot valve 36 and the line 76 to the section 11 of the control valve 54 to cause movement of the spool therein. Such movement of the spool of the section 11 of the valve 54 disconnects the line 52 from the tank 46 and connects the line 52 to the line 80 so that the high pressure fluid flow from the pump 50 drives the hydraulic motor 16. At the same time the high pressure fluid flow from the pump 50 flows through the line 52, the valve 56, the line 53 into the brake valve 58 to cause movement of the spool therein to disconnect the line 70 from the line 60 and connects the line 60 to the tank 46 through line 62 whereby the movable portions of the brake 24 instantly move out of engagement with disk 20 and the shaft 6 is free to rotate between the arms 3.

Due to the sprocket assembly 18 the energization of the hydraulic motor 16 causes the shaft 12a to rotate which by means of the gear train 14 causes the shaft 6 and the cable reel 8 to wind the cable 32 thereon. As the cable 32 is rewound on the cable reel 8 the tension in the cable 32 increases to cause clockwise (FIG. 1) rotation of the reel 8, until the reel 8 returns to its normal central position and is balanced by the force exerted on the arm 30 by the hydraulic cylinder 26. The concurrent clockwise movement of the arm 30 causes the roller 34 to return to the central cam surface 40 whereat the line 76 is disconnected from the accumulator 22 and connected to the tank 46 through line 74 so that the pressure on the spool on the section 11 of the valve 54 decreases to the tank pressure. Upon removal of the fluid pressure on the spool of the valve 54 the spool moves in a reverse direction to disconnect the line 52 from the line 80 and connects the line 52 to the tank 46 by line 84 so that the motor 16 stops reeling the cable 32 in the reel 8. When the line 52 is connected to the tank 46 the line 53 is also connected to the tank 46 so that the bias on the spool of the brake valve 58 is removed. Upon such removal of the bias on the brake valve 58 the flow of pressurized fluid from the accumulator 22 through the line 70 causes the spool of the brake valve 58 to move in the reverse direction whereby the line 70 is again connected to the line 60 and the brake 24 again engages the disk 20 to prevent further rotation of the reel 8 about the shaft 6.

In the event that the tension of the cable 32 is sufficient to overcome the thrust of the hydraulic cylinder 26 to cause clockwise rotation of the reel 8 (FIG. 1) about the shafts 12a and 12b, the roller 34 engages the roller cam surface 44 in a manner similar to that previously described with relation to the upward movement of the arm 30. Such downward movement of the arm 30 again causes the brake 24 to disengage the disk 20 as heretofore described so that the cable reel 8 is free to rotate on the shaft 6 to permit the cable 32 to be unwound therefrom. Such downward movement of the arm 30 again causes the spool of the section 11 of the valve 54 to move to connect the line 52 to the line 80 and the line 82 to the line 84. However, as the cable 32 is unwound from the reel 8 and the reel 8 is geared to the output shaft of the motor 16, the resultant clockwise (FIG. 1) rotation of the reel 8 about the shaft 6 causes the motor 16 to be driven backwards in the manner of a hydraulic pump. Upon such backward driving of the motor 16 the line 84 functions as a supply line and the line 80 functions as an exit line. Such backward driving of the motor 16 is permissible by providing the tank line 53 with sufficient capacity to handle the fluid flow from the pump 50 and the motor 16 as is well known in the art.

Although one preferred embodiment of this invention has been described herein it is to be realized that numerous modifications thereof may be made without departing from the broad spirit and scope of this invention. Thus, for example, if desired a normally open pressure responsive switch 86 may be connected to the line 76 to control the electrical energization of the motor 48 as is well known in the art. With such modification the motor 48 need only be energized upon the connecting of the line 72 to the line 76.

In view of the fact that the roller 34 travels off the opposite ends of the central cam surface 40 to permit the cable 32 to be wound and unwound from the reel 8, the surface 40 is of a sufficient length to remain in engagement with the roller 34 during minor or slight variations of tension in the cable 32 which normally occur during the operation of a belt conveyor. Also, although a hydraulic system has been described, it will be obvious that other similar purpose controls may be employed as are well known in the art.

Also, if desired, the section 9 of the valve 54 may be provided with a manually operated handle 88 for controlling the lines 80 and 82 to drive the motor 16. In order to so employ the section 9 a line 90 having a suitable hand operated valve 92 therein is connected between the line 68 and the line 74. For manual operation the valve 56 is closed to disconnect the lines 53 and 64 from the line 52 and the valve 92 is opened to connect the accumulator line 68 to the line 74. With such structure movement of the handle 88 to its operating position connects line 52 to line 80 to drive the motor 16 as heretofore described.

Having described a preferred embodiment of this invention in accordance with the patent statutes, it is to be realized that modifications thereof other than the ones specifically described heretofore, may be made without departing from the broad spirit and scope of the invention. Accordingly it is respectfully requested that this invention be interpreted as broadly as possible and be limited only by the prior art.

What I claim is:

1. A control device comprising, a storing means including shaft means, means for rotatably supporting said shaft means which extends radially therefrom and which is supported for rotation only about an axis spaced radially from said shaft means, means for normally locking said shaft means to said supporting means whereby said storing means is rotatable only about said radially spaced axis, and control means actuated by predetermined movement of said storing means about said radially spaced axis to release said locking means whereby said shaft means is rotatable with reference to said supporting means.

2. A control device comprising, a means for storing a flexible member a portion of which extends therefrom and which extending portion is movable in opposite directions, support means for rotatably supporting said storing means about an axis so that said member can be wound off and on said storing means, means for supporting said first mentioned support means for rotation only about an axis spaced radially from said first mentioned axis, releasable means for normally securing said first mentioned support means to said storing means whereby said storing means is rotatable only about said radially spaced axis, and control means actuated by predetermined movement of said storing means in opposite directions about said radially spaced axis to release said releasable means whereby said storing means is rotatable about said first mentioned axis.

3. A control device comprising, a means for storing a flexible member a portion of which extends therefrom and which extending portion is movable in opposite directions, support means for rotatably supporting said storing means about an axis so that said member can be wound off and on said storing means, means for supporting said first mentioned support means for rotation only about an axis spaced radially from said first mentioned axis, releasable means for normally securing said first mentioned support means to said storing means whereby said storing means is rotatable only about said radially spaced axis, control means actuated by predetermined movement of said storing means in opposite directions about said radially spaced axis to release said releasable means whereby said storing means is rotatable about said first mentioned axis, means for driving said storing means in a direction to wind said extending portion thereon, and said control means when actuated by said predetermined movement in one direction being operative to effect operation of said driving means.

4. A control device comprising, a means for storing a flexible member a portion of which extends therefrom and which extending portion is movable in opposite directions, support means for rotatably supporting said storing means about an axis so that said member can be wound off and on said storing means, means for supporting said first mentioned support means for rotation only about an axis spaced radially from said first mentioned axis, releasable means for normally securing said first mentioned support means to said storing means whereby said storing means is rotatable only about said radially spaced axis, control means actuated by predetermined movement of said storing means in opposite directions about said radially spaced axis to release said releasable means whereby said storing means is rotatable about said first mentioned axis, means for driving said storing means, said control means when actuated by said predetermined movement in one direction being operative to effect operation of said means for driving in a direction to wind said extending portion thereon, and at least a portion of said means for driving being driven by rotation of said storing means by said predetermined movement in a direction opposite said one direction.

5. A control device comprising, a storing means, support means for rotatably supporting said storing means about an axis so that an elongated flexible member can be wound off and on said storing means, means for supporting said first mentioned support means for rotation only about an axis spaced radially from said first mentioned axis, releasable means for securing said support means for said storing means to said storing means whereby said storing means is rotatable only about said radially spaced axis, movable means for constantly urging said support means for rotation about said radially spaced axis in one direction, and control means actuated by predetermined movement of said storing means in opposite directions around said radially spaced axis to release said releasable means whereby said storing means is rotatable about said first mentioned axis.

6. A control device comprising, a storing means, support means for rotatably supporting said storing means about an axis so that a flexible member can be wound off and on said storing means, means for supporting said first mentioned support means for rotation only about an axis spaced radially from said first mentioned axis, releasable means for securing said support means for said storing means to said storing means whereby said storing means is rotatable only about said radially spaced axis, control means actuated by predetermined movement of said storing means in opposite directions around said radially spaced axis to release said releasable means whereby said storing means is rotatable about said first mentioned axis, said control means including an elongated arm rotatable about said radially spaced axis and having a valve thereon operable upon rotation of said arm.

7. A control device comprising, a storing means, support means for rotatably supporting said storing means about an axis so that a flexible member can be wound off and on said storing means, means for rotatably supporting said first mentioned support means about an axis spaced radially from said first mentioned axis, releasable means for securing said support means for said storing means to said storing means whereby said storing means is rotatable only about said radially spaced axis, control means actuated by predetermined movement of said storing means in opposite directions around said radially spaced axis to release said releasable means whereby said storing means is rotatable about said first mentioned axis, means for rotating said storing means to wind such a flexible member thereon said control means including an elongated arm rotatable about said radially spaced axis and having a valve thereon operable upon rotation of said arm in opposite directions around said radially spaced axis to release said releasable means, and said valve being operable upon rotation of said arm in one direction of said opposite directions to cause said means for rotating said storing means to wind such a flexible member thereon.

8. A control device comprising, a cable reel having rotatable shaft means to wind and unwind cable from said reel, support means for rotatably supporting said shaft means about a central axis and an axis spaced radially from said central axis, positive driving means for rotating said reel to wind said cable thereon, said support means including an arm which is rotatable about said radially spaced axis and which extends outwardly therefrom, movable means for biasing said arm in a direction opposite that in which tension in cable extending from said reel biases said reel about said radially spaced axis, a cam surface, a valve on the end of said arm remote from said radially spaced axis having a reciprocable means engageable with said cam surface, releasable means, a source of energy for energizing said reciprocable means into movable means for biasing said reciprocable means into engagement with said cam surface and for holding said releasable means in engagement with said shaft to prevent rotation of said shaft about said central axis, and said reciprocable means being movable upon predetermined rotation of said reel about said radially spaced axis to connect means for driving said reel in a cable winding direction to release said releasable means and to maintain said source of energy.

9. A control device comprising, a cable reel having rotatable shaft means to wind and unwind cable therefrom, support means for rotatably supporting said shaft means about a central axis and an axis spaced radially from said central axis, positive driving means for rotating said reel to wind cable thereon, said support including an arm which is rotatable about said radially spaced axis and which extends outwardly therefrom, movable means for biasing said arm in a direction opposite that in which tension in cable extending from said reel biases said reel about said radially spaced axis, a cam surface, a fluid operable pilot valve on the end of said arm remote from said radially spaced axis having an elongated reciprocable plunger engageable with said cam surface, a fluid operable device connected to a first passageway in said valve, said valve having a second passageway therein adapted to be connected to a source of fluid pressure, said valve having an elongated formed bore in which said plunger is supported with one end thereof extending outwardly thereof into engagement with said cam surface, said bore having one elongated portion of a larger cross section than the remaining elongated portion, said plunger having a portion adjacent said one end closely received in the larger area portion of said bore and from which another portion of smaller cross section extends in a direction opposite said one end to be closely received in the smaller area portion of said bore, said second passageway being connected to said bore at the juncture of said elongated portions thereof to bias said plunger outward into engagement with said cam surface due to the larger cross sectional area thereof, said plunger being movable outwardly of said arm upon rotation thereof, and a third passageway in said valve connecting said first and second passageways when said plunger moves outwardly.

10. A control device comprising, a fluid operable device connected to a first passageway in a fluid operated valve, said valve having a second passageway therein adapted to be connected to a source of fluid pressure, restraining means, said valve having an elongated formed bore in which an elongated formed plunger is supported for reciprocable movement with one end thereof extending outwardly thereof into engagement with said restraining means, said bore having one elongated portion of a larger cross section than the remaining elongated portion, said plunger having a portion adjacent said one end closely received in the larger area portion of said bore and from which another portion of smaller cross section extends in a direction opposite said one end to be closely received in the smaller area portion of said bore, said second passageway being connected to said bore at the juncture of said elongated portions thereof to bias said plunger outward into engagement with said restraining means due to the larger cross sectional area thereof, said valve being movable to cause said one end of said plunger to disengage said restraining means, and a third passageway in said valve connecting said first and second passageways when said plunger disengages said restraining means.

11. A cable storing device comprising, a cable reel, power output means for driving said reel to wind cable thereon, a source of energy connected to a control means which controls transmission of energy from said source to said driving means, said control means having movable means normally occupying one position whereby said source is disconnected from said driving means, a pilot means having ingress and exit energy transmitting means connected to said source and to said control means, respectively, said pilot means having constantly biased movable means, restraining means engageable with said pilot means, movable means for locating said biased movable means to disconnect said source from said exit means, said pilot means being supported for movement with respect to said restraining means so that said biased movable means disengages said restraining means and is thereafter moved to connect said source to said exit means, and said exit means being connected in energy transmitting relationship to said control means to cause movement of said movable means of said control means from said one position when said source is connected to said exit means so that said source is connected to said driving means.

12. A cable storing device comprising, a cable reel, fluid operated means for driving said reel to wind cable thereon, a source of fluid pressure connected to a control valve which is connected to said driving means for controlling transmission of fluid pressure from said source to said driving means, said control valve having movable means normally occupying one position whereby said source is disconnected from said driving means, a pilot valve having ingress and exit fluid transmitting means connected to said source and to said control valve, respectively, said pilot valve having movable means constantly biased by said source, restraining means engageable with said pilot valve movable means for locating said pilot valve movable means to disconnect said source from said exit means, said pilot valve being supported for movement with respect to said restraining means so that said pilot valve movable means disengages said restraining means and is thereafter moved and said source is connected to said exit means, and said exit means being connected to said control valve to cause movement of said control valve movable means from said one position when said source is connected to said exit means so that said source is additionally connected to said driving means.

13. A cable storing device comprising, a cable reel, fluid operated means for driving said reel to wind cable thereon, a control valve, a source of fluid pressure connected to said control valve which is connected to said driving means for controlling transmission of fluid pressure from said source to said driving means, said control valve having movable means normally occupying one position whereby said source is disconnected from said driving means, a pilot valve having ingress and exit fluid transmitting means connected to said source and to said control valve, respectively, said pilot valve having movable means constantly biased by said source, restraining means engageable with said pilot valve movable means for locating said pilot valve movable means to disconnect said source from said exit means, said pilot valve being supported for movement with respect to said restraining means so that said pilot valve movable means disengages said restraining means and is thereafter moved and said source is connected to said exit means, said exit means being connected to said control valve to cause movement of said control valve movable means from said one position when said source is connected to said exit means so that said source is additionally connected to said driving means, and said fluid operated means being drivable in a direction opposite said cable winding direction to permit cable to be unwound therefrom.

14. A cable storing device comprising, a cable reel, fluid operated means for driving said reel to wind cable thereon, a control valve, a source of fluid pressure connected to said control valve which is connected to said driving means for controlling transmission of fluid pressure from said source to said driving means, said control valve having movable means normally occupying one position whereby said source is disconnected from said driving means, a pilot valve having ingress and exit fluid transmitting means connected to said source and to said control valve, respectively, said pilot valve having movable means constantly biased by said source, restraining means engageable with said pilot valve movable means for normally locating said pilot valve movable means to disconnect said source from said exit means, said pilot valve being supported for movement with respect to said restraining means so that said pilot valve movable means disengages said restraining means and is thereafter moved and said source is connected to said exit means, said source being connected to movable means for biasing said pilot valve in its normal operating position and said exit means being connected to said control valve to cause movement of said control valve movable means from said one position when said source is connected to said exit means so that said source is additionally connected to said driving means.

15. A control device comprising, a cable storing means including shaft means, means for rotatably supporting said shaft means which extends radially therefrom and which is rotatable about an axis spaced radially from said shaft means, means for normally locking said shaft means to said supporting means whereby said storing means is rotatable only about said radially spaced axis, fluid operated means for driving said storing means to wind cable thereon, a control valve, a source of fluid pressure connected to said control valve which is connected to said driving means for controlling transmission of fluid pressure from said source to said driving means, said control valve having movable means normally occupying one position whereby said source is disconnected from said driving means, a pilot valve having ingress and exit fluid transmitting means connected to said source and to said control valve, respectively, said pilot valve having movable means constantly biased by said source, restraining means engageable with said pilot valve movable means for locating said pilot valve movable means to disconnect said source from said exit means, said pilot valve being secured to said radially extending supporting means for movement with respect to said restraining means so that said pilot valve movable means disengages said restraining means and is thereafter moved and said source is connected to said exit means, and said exit means being connected to said control valve to cause movement of said control valve movable means from said one position when said source is connected to said exit means so that said source is additionally connected to said driving means, and additional control means actuated by said source after predetermined movement of said storing means about said radially spaced axis to release said locking means whereby said shaft means is rotatable.

16. A control device comprising, a cable storing means including shaft means, means for rotatably supporting said shaft means which extends radially therefrom and which is rotatable about an axis spaced radially from said shaft means, means for normally locking said shaft means to said supporting means whereby said storing means is rotatable only about said radially spaced axis, power output means for driving said storing means to wind cable thereon, a source of energy connected to a control means which controls transmission of energy from said source to said driving means, said control means having movable means normally occupying one position whereby said source is disconnected from said driving means, a pilot means having ingress and exit energy transmitting means connected to said source and to said control means, respectively, said pilot means having constantly biased movable means, restraining means engageable with said pilot means movable means for locating said pilot means movable means to disconnect said source from said exit means, said pilot means being secured to said radially extending supporting means for movement with respect to said restraining means so that said pilot means movable means disengages said restraining means and is thereafter moved to connect said source to said exit means, and said exit means being connected in energy transmitting relationship to said control means to cause movement of said control means movable means from said one position when said source is connected to said exit means so that said source is connected to said driving means, and additional control means actuated by said source after predetermined movement of said storing means about said radially spaced axis to release said locking means whereby said shaft means is rotatable.

17. A cable storing device comprising, a cable reel mounted on a pivotable support for rotation about an axis, means for driving said reel to wind cable thereon, a source of energy, a control means operatively connected to said driving means for controlling the operation thereof, a valve means mounted on said support and operatively connected to said energy source and to said control means respectively, and said valve means has movable means therein which normally disconnects said source from said control means, said control means having movable means therein normally occupying one position whereby said driving means cannot operate, and said valve means being supported with said cable reel for pivotal movement therewith so that on movement thereof said movable means of said valve means connects said source to said control means to cause movement of said movable means of said control means to actuate said driving means.

References Cited in the file of this patent

UNITED STATES PATENTS

| | | |
|---|---|---|
| 1,320,023 | Miller | Oct. 28, 1919 |
| 1,405,612 | Miller | Feb. 7, 1922 |
| 2,008,687 | Dean | July 23, 1935 |